United States Patent
Bussa et al.

(10) Patent No.: US 8,019,566 B2
(45) Date of Patent: Sep. 13, 2011

(54) SYSTEM AND METHOD FOR EFFICIENTLY TESTING CACHE CONGRUENCE CLASSES DURING PROCESSOR DESIGN VERIFICATION AND VALIDATION

(75) Inventors: Vinod Bussa, Hi-tech city (IN); Shubhodeep Roy Choudhury, Karnataka (IN); Manoj Dusanapudi, Karnataka (IN); Sunil Suresh Hatti, Karnataka (IN); Shakti Kapoor, Austin, TX (US); Batchu Naga Venkata Satyanarayana, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 707 days.

(21) Appl. No.: 11/853,154

(22) Filed: Sep. 11, 2007

(65) Prior Publication Data
US 2009/0070532 A1 Mar. 12, 2009

(51) Int. Cl.
*G06F 11/26* (2006.01)
*G06F 11/00* (2006.01)

(52) U.S. Cl. ........ 702/123; 702/117; 702/118; 702/119; 714/718

(58) Field of Classification Search .................. 702/123, 702/117–120
See application file for complete search history.

(56) References Cited

U.S. PATENT DOCUMENTS

| | | | |
|---|---|---|---|
| 4,800,486 A | 1/1989 | Horst | 364/200 |
| 4,910,663 A | 3/1990 | Bailey | 714/34 |
| 5,133,061 A * | 7/1992 | Melton et al. | 711/128 |
| 5,182,811 A | 1/1993 | Sakamura | 710/264 |
| 5,202,889 A | 4/1993 | Aharon | 371/27 |
| 5,216,672 A | 6/1993 | Tatosian et al. | 714/718 |
| 5,218,703 A | 6/1993 | Fleck et al. | 710/264 |
| 5,331,643 A | 7/1994 | Smith | 714/728 |
| 5,396,619 A | 3/1995 | Walton | 714/8 |
| 5,426,750 A | 6/1995 | Becker et al. | 711/207 |
| 5,469,443 A | 11/1995 | Saxena | 714/720 |
| 5,475,822 A | 12/1995 | Sibigtroth et al. | 712/228 |
| 5,488,573 A | 1/1996 | Brown | 364/578 |

(Continued)

FOREIGN PATENT DOCUMENTS

JP 2000020341 A2 1/2000

(Continued)

OTHER PUBLICATIONS

Office Action for co-pending U.S. Appl. No. 11/853,163, mailed Jan. 22, 2010, 6 pages.

(Continued)

*Primary Examiner* — Hal D Wachsman
(74) *Attorney, Agent, or Firm* — Van Leeuwen & Van Leeuwen; Matthew B. Talpis (57) ABSTRACT

A system and method for using a single test case to test each sector within multiple congruence classes is presented. A test case generator builds a test case for accessing each sector within a congruence class. Since a congruence class spans multiple congruence pages, the test case generator builds the test case over multiple congruence pages in order for the test case to test the entire congruence class. During design verification and validation, a test case executor modifies a congruence class identifier (e.g., patches a base register), which forces the test case to test a specific congruence class. By incrementing the congruence class identifier after each execution of the test case, the test case executor is able to test each congruence class in the cache using a single test case.

20 Claims, 10 Drawing Sheets

U.S. PATENT DOCUMENTS

| | | | |
|---|---|---|---|
| 5,584,013 A * | 12/1996 | Cheong et al. | 711/122 |
| 5,701,495 A | 12/1997 | Arndt et al. | 710/263 |
| 5,761,408 A | 6/1998 | Kolawa | 714/38 |
| 5,784,550 A | 7/1998 | Brockmann et al. | 714/33 |
| 5,784,606 A | 7/1998 | Hoy et al. | 714/33 |
| 5,784,698 A | 7/1998 | Brady et al. | 711/171 |
| 5,815,696 A | 9/1998 | Tanaka et al. | 712/233 |
| 5,822,578 A | 10/1998 | Frank et al. | 712/244 |
| 5,996,097 A | 11/1999 | Evans et al. | 714/719 |
| 6,006,028 A | 12/1999 | Aharon et al. | 703/21 |
| 6,014,756 A * | 1/2000 | Dottling et al. | 714/15 |
| 6,019,501 A | 2/2000 | Okazaki | 714/718 |
| 6,070,218 A | 5/2000 | Giles et al. | 710/260 |
| 6,070,220 A | 5/2000 | Katayama | 710/264 |
| 6,157,980 A * | 12/2000 | Arimilli et al. | 711/3 |
| 6,167,479 A | 12/2000 | Hartnett et al. | 710/260 |
| 6,212,613 B1 | 4/2001 | Belair | 711/207 |
| 6,223,271 B1 | 4/2001 | Cepulis | 711/206 |
| 6,223,337 B1 | 4/2001 | Blume | 717/4 |
| 6,226,716 B1 | 5/2001 | Bauman et al. | 711/145 |
| 6,253,338 B1 | 6/2001 | Smolders | 714/45 |
| 6,286,116 B1 | 9/2001 | Bhavsar | 714/720 |
| 6,367,042 B1 | 4/2002 | Phan | 714/733 |
| 6,381,715 B1 | 4/2002 | Bauman et al. | 714/718 |
| 6,609,216 B1 | 8/2003 | Almy et al. | 714/25 |
| 6,662,297 B1 | 12/2003 | Boom et al. | 712/245 |
| 6,675,338 B1 | 1/2004 | Golshan | 714/739 |
| 6,684,359 B2 | 1/2004 | Noy | 714/741 |
| 6,694,461 B1 | 2/2004 | Treuer | 714/719 |
| 6,701,461 B2 | 3/2004 | Oura | 714/42 |
| 6,735,746 B2 | 5/2004 | Thompson et al. | 716/136 |
| 6,772,326 B2 | 8/2004 | Chauvel et al. | 712/244 |
| 6,865,501 B2 * | 3/2005 | Huisman et al. | 702/117 |
| 6,920,416 B1 | 7/2005 | Swoboda et al. | 703/13 |
| 6,950,771 B1 | 9/2005 | Fan et al. | 702/117 |
| 6,968,428 B2 | 11/2005 | Maly et al. | 711/128 |
| 6,993,685 B2 | 1/2006 | Ramaswamy | 714/43 |
| 7,010,734 B2 | 3/2006 | Brahme | 714/724 |
| 7,013,383 B2 | 3/2006 | Shelor | 712/244 |
| 7,020,854 B2 | 3/2006 | Killian et al. | 716/1 |
| 7,058,909 B2 | 6/2006 | Lu | 16/4 |
| 7,073,106 B2 | 7/2006 | Paredes | 714/720 |
| 7,111,287 B2 | 9/2006 | Garvey | 717/144 |
| 7,133,816 B2 | 11/2006 | Adir | 703/14 |
| 7,222,179 B2 | 5/2007 | Srivastava et al. | 709/226 |
| 7,240,243 B2 | 7/2007 | Decker | 714/33 |
| 7,356,436 B2 | 4/2008 | Bohizic et al. | 702/119 |
| 7,373,446 B2 | 5/2008 | Post et al. | 710/261 |
| 7,536,694 B2 | 5/2009 | Blinick et al. | 719/310 |
| 7,669,083 B2 | 2/2010 | Arora et al. | 714/25 |
| 7,752,499 B2 | 7/2010 | Choudhury et al. | 714/25 |
| 7,797,650 B2 | 9/2010 | Bag et al. | 716/4 |
| 7,831,979 B2 | 11/2010 | Whalen | 718/108 |
| 2001/0007970 A1 | 7/2001 | Kohno et al. | 702/117 |
| 2003/0097550 A1 | 5/2003 | Chauvel et al. | 712/244 |
| 2004/0143720 A1 | 7/2004 | Mansell et al. | 711/206 |
| 2004/0143819 A1 | 7/2004 | Cheng et al. | 717/125 |
| 2004/0268103 A1 | 12/2004 | Shelor | 712/244 |
| 2005/0159925 A1 | 7/2005 | Gedamu | 714/42 |
| 2005/0204231 A1 | 9/2005 | Mukherjee et al. | 714/733 |
| 2005/0210452 A1 | 9/2005 | Dimpsey et al. | 717/120 |
| 2005/0278702 A1 | 12/2005 | Koyfman et al. | 717/124 |
| 2006/0101181 A1 | 5/2006 | Post et al. | 710/266 |
| 2006/0149952 A1 | 7/2006 | Blinick et al. | 712/244 |
| 2006/0161897 A1 | 7/2006 | Biberstein et al. | 717/124 |
| 2006/0195573 A1 | 8/2006 | Srivastava et al. | 709/224 |
| 2006/0212756 A1 | 9/2006 | Emek et al. | 714/30 |
| 2006/0224863 A1 | 10/2006 | Lovett et al. | 712/215 |
| 2009/0070643 A1 | 3/2009 | Anvekar et al. | 714/718 |
| 2009/0300441 A1 | 12/2009 | Andreev et al. | 714/718 |

FOREIGN PATENT DOCUMENTS

| | | |
|---|---|---|
| TW | 0440765 B | 6/2001 |

OTHER PUBLICATIONS

Notice of Allowance for co-pending U.S. Appl. No. 11/853,130, mailed Oct. 6, 2009, 8 pages.

Office Action for U.S. Appl. No. 11/853,170, mailed Oct. 12, 2010, 7 pages.

Office action for U.S. Appl. No. 11/853,154, mailed May 25, 2010, 10 pages.

Office action for U.S. Appl. No. 11/853,154, mailed Nov. 5, 2010, 8 pages.

Hubbard, PJ, "Memory Testing With Linear Feedback Shift Register," IBM Technical Disclosure Bulletin, 11-86 P.2475, 1986, 1 page.

Notice of Allowance for U.S. Appl. No. 11/853,154, mailed Feb. 22, 2011, 5 pages.

Notice of Allowance for U.S. Appl. No. 11/853,163, mailed May 11, 2010, 9 pages.

Arimilli, et al., "High-Performance Combined Data/Address Memory Test," IBM Technical Disclosure, n7 12-90 pp. 104-108, 1990.

Notice of allowance for U.S. Appl. No. 11/853,189, mailed Feb. 22, 2010, 9 pages.

Office Action for U.S. Appl. No. 11/853,208, mailed Jan. 31, 2011, 24 pages.

Office Action for U.S. Appl. No. 11/853,212, mailed Aug. 24, 2009, 13 pages.

Office Action for U.S. Appl. No. 11/853,212, mailed Mar. 4, 2010, 12 pages.

Office Action for U.S. Appl. No. 11/853,212, mailed Aug. 13, 2010, 12 pages.

Notice of Allowance for U.S. Appl. No. 11/853,212, mailed Feb. 4, 2011, 5 pages.

Notice of Allowance for U.S. Appl. No. 11/853,212, mailed Mar. 10, 2011, 15 pages.

Notice of Allowance for U.S. Appl. No. 11/853,170, mailed Apr. 13, 2011, 7 pages.

Office Action for U.S. Appl. No. 11/853,201, mailed Apr. 14, 2011, 20 pages.

Final Office Action for U.S. Appl. No. 11/853,208, mailed Jun. 7, 2011, 29 pages.

* cited by examiner

SYSTEM AND METHOD FOR EFFICIENTLY TESTING CACHE CONGRUENCE CLASSES DURING PROCESSOR DESIGN VERIFICATION AND VALIDATION

BACKGROUND OF THE INVENTION

1. Technical Field

The present invention relates to a system and method for efficiently testing cache congruence classes during processor design verification and validation. More particularly, the present invention relates to a system and method for minimizing test case build time by using a single test case to test each sector within multiple congruence classes.

2. Description of the Related Art

Processor testing tools exist whose goal is to generate the most stressful test case for a processor. In theory, the generated test case should provide maximum test coverage and should be interesting enough to stress various timing scenarios on the processor. The whole technology of these tools sits in the logic of building these test cases. Verifying and validating a processor using test cases typically includes three stages, which are 1) a test case build stage, 2) a test case execution stage, and 3) a validation and verification stage.

A processor typically includes one or more caches that also require validation and verification, which are small and fast memories (relative to main memory) that are physically close to the processor's core. Since caches are much smaller than the main memory, only the most recently used memory blocks or lines reside in the cache at any given time. As a result, processor designs include a mapping algorithm that maps multiple addresses to different blocks in a cache. One such mapping algorithm divides effective addresses into three sections, which are a tag, and index, and an offset. The tag bits identify a block location within the cache. The index bits identify a cache line within the cache, and the offset bits identify a byte location within the cache line.

The index is also referred to as "congruence class." In a configuration where the cache is an n-way associative cache, each index includes 'n' lines, such as a 512 KB, 8-way set associative L2 cache. As such, each congruence class includes 'n' ways. When a processor indexes into the cache, the processor performs a linear search to locate the exact way or line, and then uses the offset bits to locate the particular byte to access. A challenge found, however, is that a large amount of test cases are required in order to fully test each of the cache's congruence classes/ways. Unfortunately, this consumes a large amount of build time, which leaves less time available for test case execution, validation and verification.

In addition, a cache's contents are typically divided into sectors that have corresponding parity bits. Calculating parity for a sector is implementation dependent, and typically commences once a test case accesses the sector. A challenge found, however, is creating a test case that frequently transitions bits in each sector such that a cache parity error is detected in the shortest possible time.

What is needed, therefore, is a system and method for efficiently testing each congruence class/way within a cache while sufficiently accessing each sector in order to quickly detect cache parity errors.

SUMMARY

It has been discovered that the aforementioned challenges are resolved using a system and method for using a single test case to test each sector within multiple congruence classes. A test case generator builds a test case for accessing each sector within a congruence class. Since a congruence class spans multiple congruence pages, the test case generator builds the test case over multiple congruence pages in order for the test case to test the entire congruence class. During design verification and validation, a test case executor modifies a congruence class identifier (e.g., patches a base register), which forces the test case to test a specific congruence class. By incrementing the congruence class identifier after each test case execution, the test case executor is able to test each congruence class in the cache using a single test case.

A test case generator builds a test case and passes the test case to a test case executor, which includes a scheduler, a dispatcher, and a results comparator. The scheduler schedules the test case to test a first congruence class (congruence class 0) and dispatches the test case to the dispatcher. In turn, the dispatcher dispatches the test case to a processor. The processor executes the test case, which tests the processor cache's congruence class 0, and provides hardware results to the results comparator. The results comparator checks the results against known values and provides a pass/fail result to the scheduler.

When the scheduler receives a pass result, the scheduler patches the base register in the test case, which increments a congruence class identifier and references the next congruence class (e.g., congruence class 1). The scheduler then schedules the same test case that includes the new congruence class identifier value to the dispatcher. The dispatcher dispatches the test case to the processor that executes the test case, which tests the processor cache's congruence class 1. The scheduler continues to increment the congruence class identifier after each test case execution until the test case tests each of the processor cache's congruence classes.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
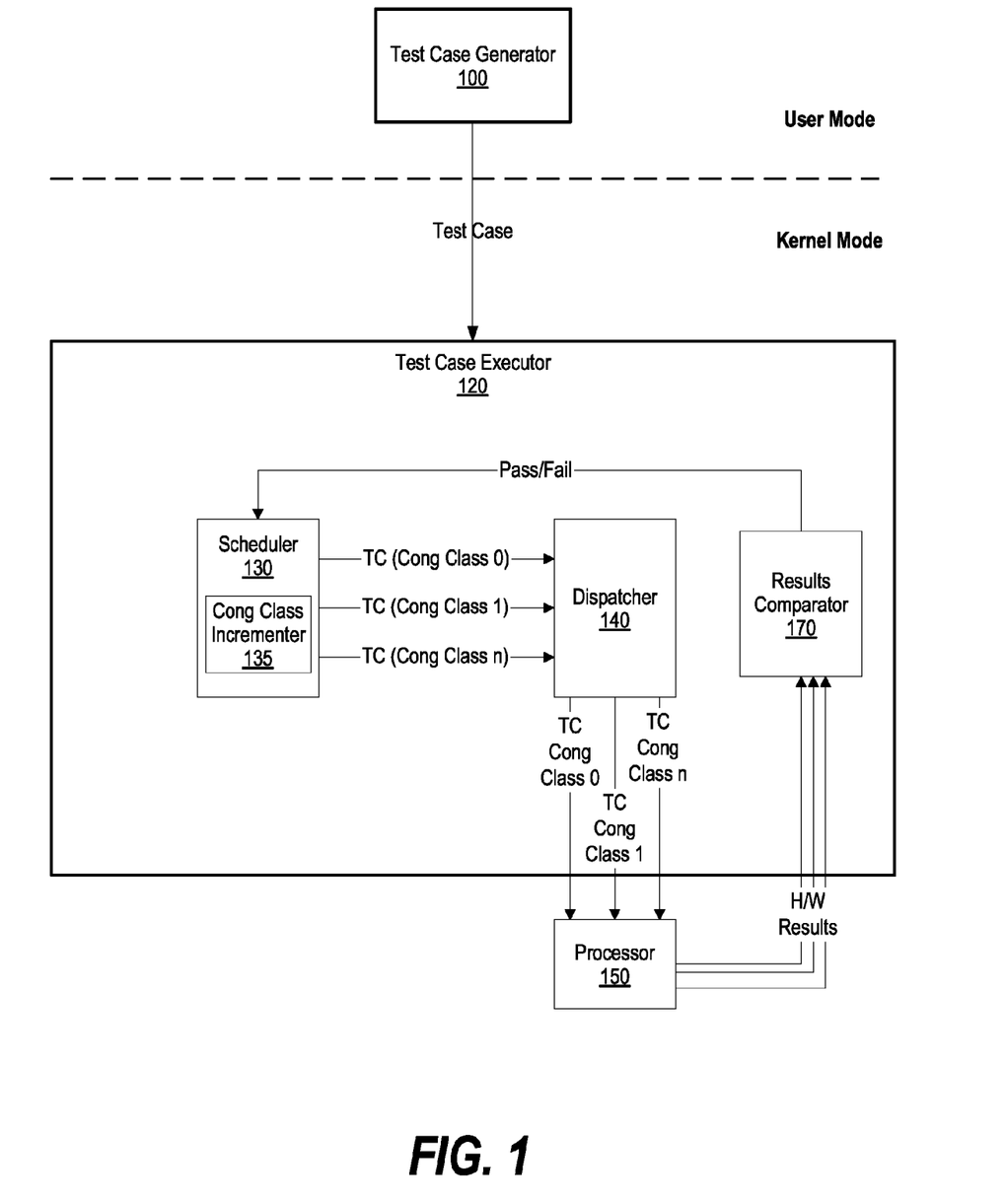
FIG. 1 is a diagram showing a test case executor using one test case, which tests each sector within an entire congruence class, to test a cache that includes multiple congruence classes by incrementing a congruence class identifier value.

FIG. 1 is a diagram showing a test case executor using one test case, which tests each sector within an entire congruence class, to test a cache that includes multiple congruence classes by incrementing a congruence class identifier value.

Test case generator 100 generates a test case in which each of its instructions accesses a single congruence class. A congruence class spans multiple congruence pages and corresponds to a congruence class identifier. As such, the test case is built over the multiple congruence pages such that the test case covers the entire congruence class (see FIGS. 2, 3, and corresponding text for further details).

Test case executor 120's scheduler 130 schedules the test case to test a first congruence class (congruence class 0) and dispatches the test case to dispatcher 140. In turn, dispatcher 140 dispatches the test case to processor 150. Processor 150 executes the test case and provides hardware results to results comparator 170. Results comparator 170 checks the results against known values, and provides a pass/fail result to scheduler 130.

When scheduler 130 receives a pass result, scheduler 130 uses congruence class incrementer 135 to patch a base register in the test case, which increments a congruence class identifier and references the next congruence class (e.g., congruence class 1). Scheduler 130 schedules the same test case that now includes a different congruence class identifier value to dispatcher 140. Dispatcher 140 dispatches the test case to processor 150 that executes the test case, which tests congruence class 1 within processor 150's cache. Processor 150 provides hardware results to results comparator 170. Scheduler 130 continues to increment the congruence class identifier values until each of the congruence classes included in processor 150's cache are tested. As a result, processor 150's cache is tested using a single test case provided by test case generator 100.

Figure 2:
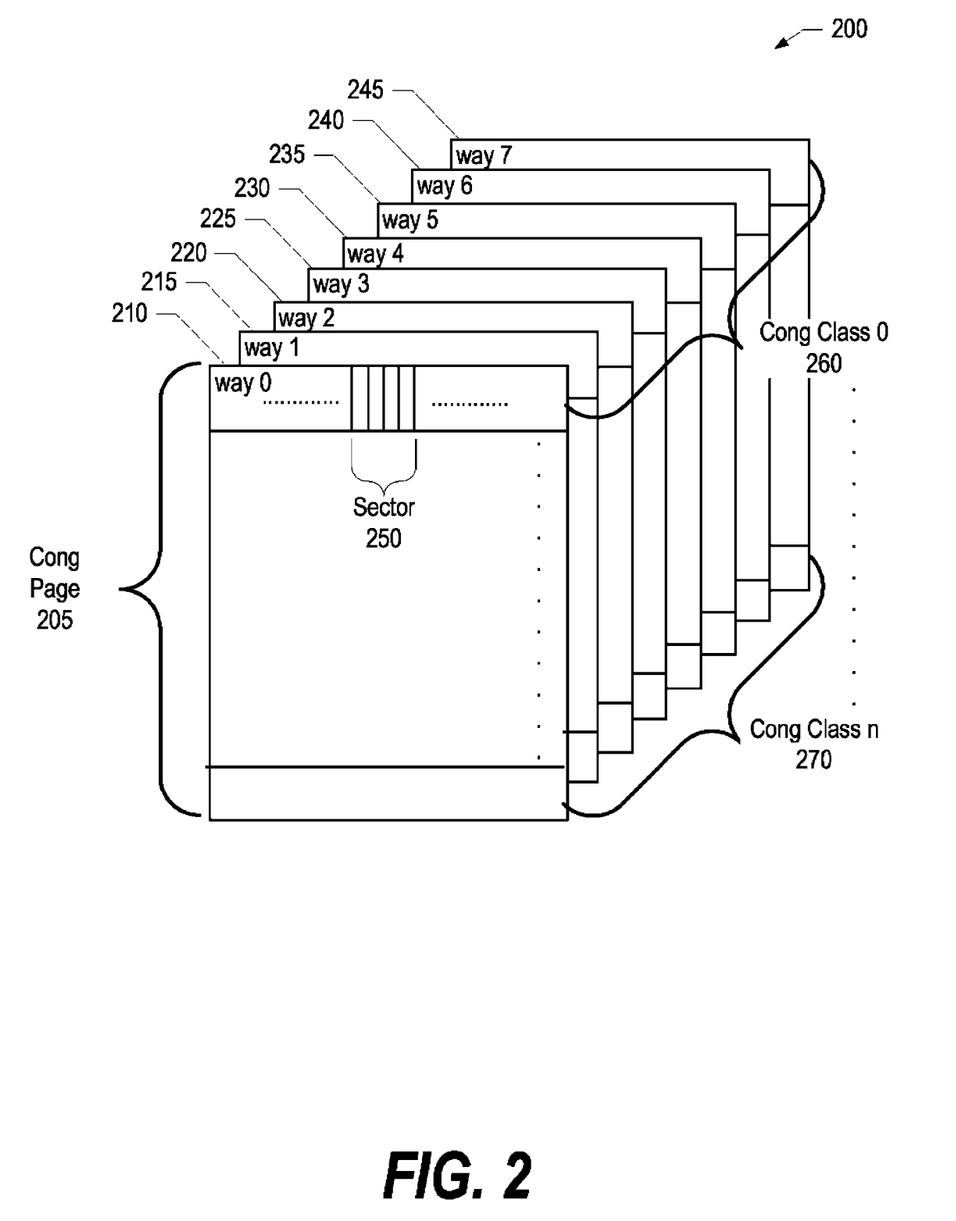
FIG. 2 is a diagram showing a processor's cache configuration.

FIG. 2 is a diagram showing a processor's cache configuration. The implementation of cache 200 is in the form of congruence classes and ways. Cache 200 includes eight ways, which are ways 210-245. Each way corresponds to a congruence page. For example, way 0 210 corresponds to congruence page 205.

A congruence class comprises a cache line in each of the ways. As can be seen, congruence class 0 260 comprises the first cache line in ways 210-245. Therefore, each congruence page includes cache lines corresponding to multiple congruence classes. As can be seen, congruence page 205 includes a cache line corresponding to congruence class 0 260 through congruence class n 270. In order to ensure that a test case produces the same results when testing any of the congruence classes, data is duplicated for each cache line within a given way. For example, the data in congruence class 0 260 way 0 210 is the same as the data in congruence class n 270 way 0 210.

Each cache line within a way is divided into sectors (sector 250), which is a number of bytes depending upon cache 200's geometry. The invention described herein creates a test case to test each sector within a particular congruence class, and then re-executes the same test pattern to test different congruence classes. For example, a test case generator may build a test case to test each sector within congruence class 0 260, which includes each of the sectors included in the first cache line in ways 210 through 245. Once the test case finishes executing, the test cases base register is incremented to now point to a different congruence class (e.g., congruence class 1), and test each sector within the different congruence class.

Figure 3:
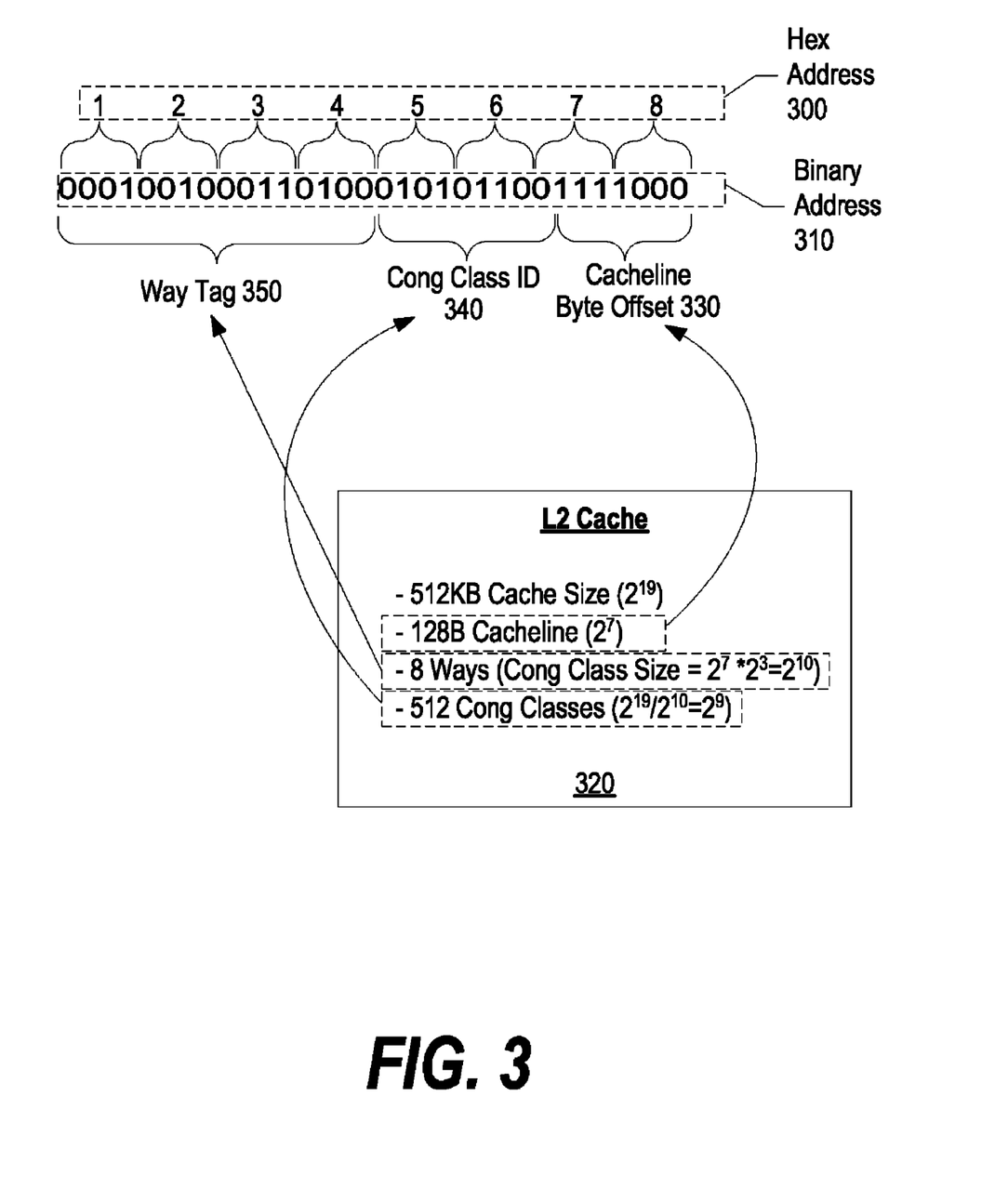
FIG. 3 is a diagram showing the configuration of a test case base register.

FIG. 3 is a diagram showing the invention described herein using a memory address for indexing into a cache. FIG. 3 shows hex address 300 converted to binary address 310 in order to illustrate the duty of each bit within a test case base register. As one skilled in the art can appreciate, cache 200 may be configured differently than what is shown in FIG. 3.

FIG. 3 shows L2 cache 320, which has a 512 KB cache size and each cache line is 128 bytes long. Again, as one skilled in the art can appreciate, L2 cache 320 may be configured differently than what is shown in FIG. 3.

Since each cache line is 128 bytes long, or 27 bytes, seven bits are required to specify a particular byte location within a cache line. As such, cache line byte offset 330 consists of the seven rightmost bits of binary address 310.

FIG. 3 also shows that L2 cache 320 is configured into eight ways, and way tag 350 signifies which one of the eight ways to access through a decoding process. Since L2 cache 320 is configured into eight ways, the size of each congruence class is one cache line (128B) times eight ways, or $2^7 * 2^3 = 2^{10}$ bytes. Therefore, since each congruence class is $2^{10}$ bytes, and L2 Cache 320 is 512 KB ($2^{19}$), L2 cache 320 includes $2^{19}/2^{10} = 2^9$ (512) congruence classes. As such, congruence class identifier 340 requires 9 bits of binary address 310 to specify a particular congruence class. The invention described herein patches congruence class identifier 340 in order to select and test different congruence classes within L2 cache 320 using the same test pattern.

Figure 4:
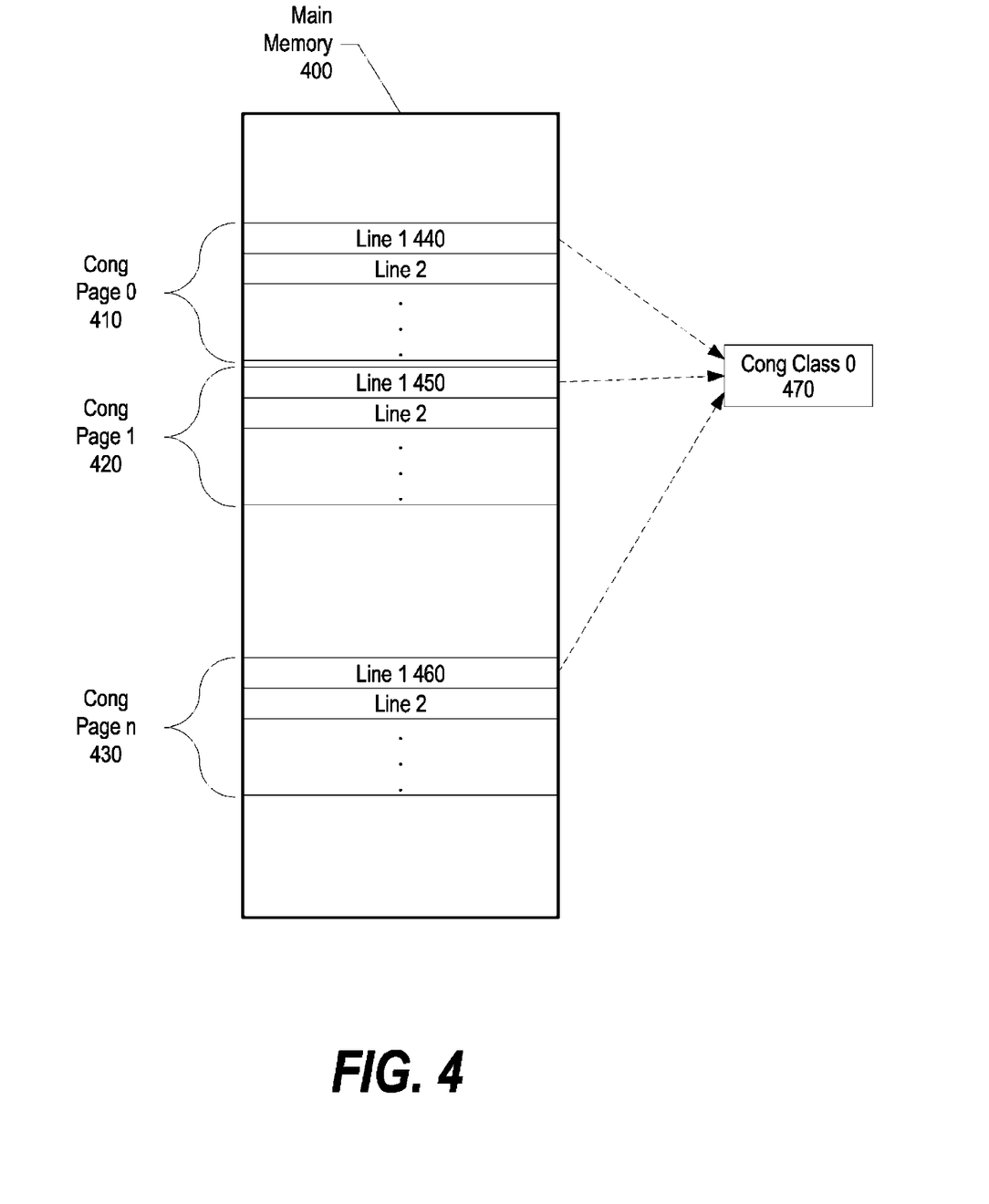
FIG. 4 is a diagram showing the relationship between main memory, congruence pages, and a congruence class.

FIG. 4 is a diagram showing the relationship between main memory, congruence pages, and a congruence class. Main memory 400 includes data for congruence pages 0 410 through n 430. When the data is loaded into a cache based upon the cache's configuration, the first line within each congruence page (lines 440, 450, and 460) comprises congruence class 0 470. In turn, the second line within each congruence page comprises the next congruence class, and so on until each congruence class is loaded into the cache.

Figure 5:
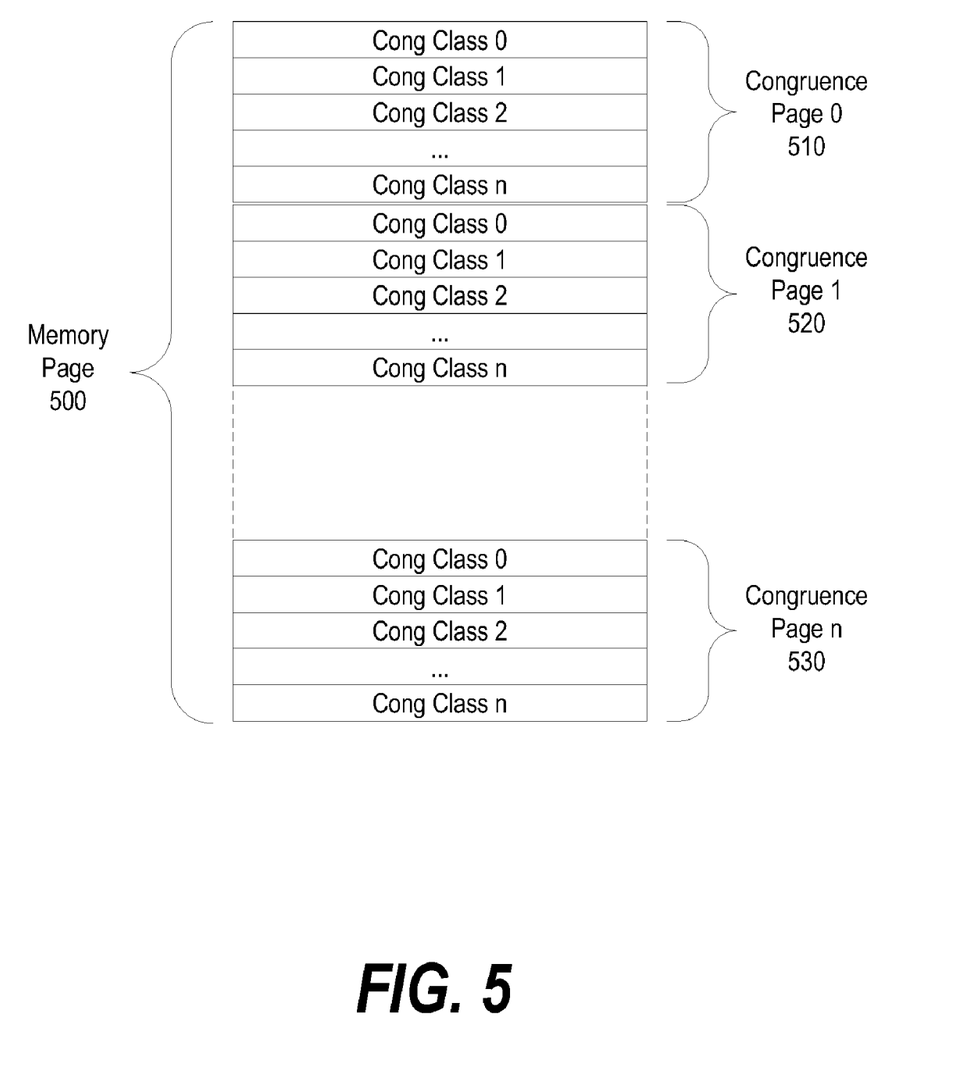
FIG. 5 is a diagram showing the relationship between a page of memory and congruence classes.

FIG. 5 is a diagram showing the relationship between a page of memory and congruence classes. The diagram in FIG. 5 shows that a memory page is larger than a congruence page. As such, multiple congruence pages (congruence page 0 510 through n 530) fit within memory page 500. The invention described herein duplicates data within each congruence class in order for test case results to remain the same as a test case tests the different congruence classes. For example, data within each cache line included in congruence page 0 510 is the same. Likewise, data within each cache line included in congruence page 1 520 is the same, and so on. As a result, a test case can test any given congruence class and produce the same result.

Figure 6:
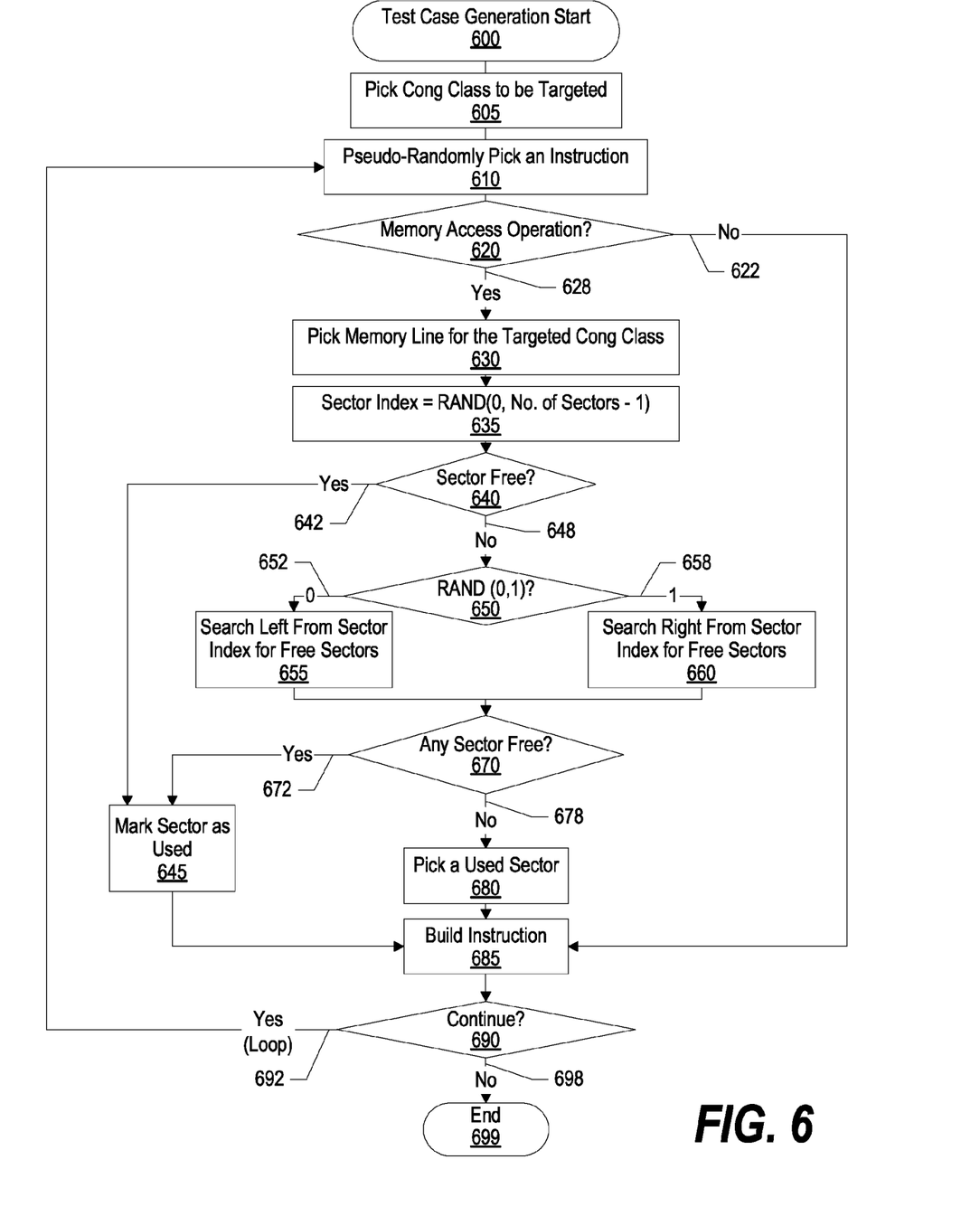
FIG. 6 is a flowchart showing steps taken in generating a test case to access each sector within a congruence class.

FIG. 6 is a flowchart showing steps taken in generating a test case to access each sector within a congruence class. Processing commences at 600, whereupon processing picks an initial congruence class for which to generate the test case, such as "congruence class 0" (step 605).

At step 610, processing pseudo-randomly picks an instruction. A determination is made as to whether the instruction is a memory access operation, such as a load/store operation (decision 620). If the instruction is not a memory access operation, decision 620 branches to "No" branch 622 whereupon processing builds the instruction at step 685.

On the other hand, if the instruction is a memory access operation, decision 620 branches to "Yes" branch 628 whereupon processing picks a memory line for the targeted congruence class at step 630. Processing, at step 635, randomly selects a sector in the memory line. A determination is made as to whether the selected sector is free (not already planned for access by a previous instruction) (decision 640). If the sector is free, decision 640 branches to "Yes" branch 642 whereupon processing marks the sector as used (step 645) and builds the instruction to access the sector (step 685).

On the other hand, if the randomly selected sector is not free, decision 640 branches to "No" branch 648 whereupon a determination is made as to whether to sequentially search to the right or to the left of the sector index for a free sector (decision 650). If processing should search to left, decision 650 branches to "0" branch 652 whereupon processing searches to the left from the selected sector index for a free sector (step 655). On the other hand, if processing should search to right, decision 650 branches to "1" branch 658 whereupon processing searches to the right from the selected sector index for a free sector (step 660).

A determination is made as to whether processing identified any free sectors (either searching to the right or searching to the left) (decision 670). If processing identified a free sector, decision 670 branches to "Yes" branch 672 whereupon processing marks the sector as used (step 645), and builds the instruction to access the sector (decision 685). On the other hand, if processing did not locate a free sector, decision 670 branches to "No" branch 678 whereupon processing picks a used sector and builds an instruction to access the used sector (step 685).

A determination is made as to whether to continue building the test case, such as when each sector within each memory line is marked used (decision 690). If processing should continue, decision 690 branches to "Yes" branch 692, which loops back to pick and build another instruction. This looping continues until processing should terminate, at which point decision 690 branches to "No" branch 698 whereupon processing ends at 699.

Figure 7:
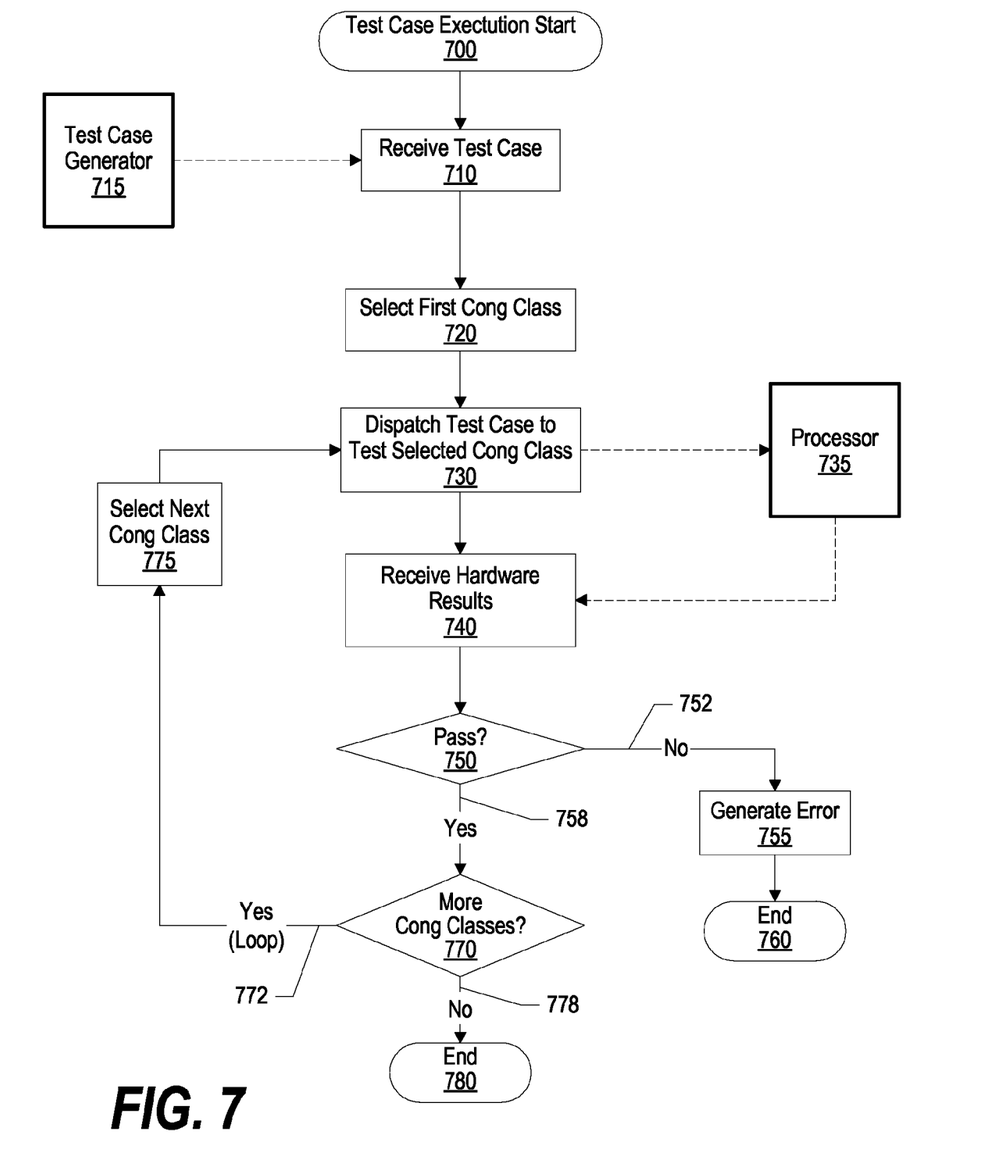
FIG. 7 is a flowchart showing steps taken in re-executing a test case in order to test multiple congruence classes.

FIG. 7 is a flowchart showing steps taken in re-executing a test case in order to test multiple congruence classes. Processing commences at 700, whereupon processing receives a test case from test case generator 715 (step 710). The test case is built to access each sector within a particular congruence class.

At step 720, processing selects a first congruence class, which is typically the congruence class for which the test case is built. Processing dispatches the test case to processor 735 at step 730, which tests the first congruence class within processor 735's cache.

At step 740, processing receives test case hardware results from processor 735. A determination is made as to whether the hardware results pass by comparing the hardware results to known values (decision 750). If the hardware results do not pass, decision 750 branches to "No" branch 752 whereupon processing generates an error at 755, and processing ends at 760. On the other hand, if the hardware results pass, decision 750 branches to "Yes" branch 758, whereupon a determination is made as to whether there are more congruence classes to test (decision 770).

If there are more congruence classes to test, decision 770 branches to "Yes" branch 772, which loops back to select the next congruence class by patching a congruence class identifier value (step 775), and dispatches the test case with the new congruence class identifier value. This looping continues until there are no more congruence classes to test, at which point decision 770 branches to "No" branch 778 whereupon processing ends at 780.

Figure 8:
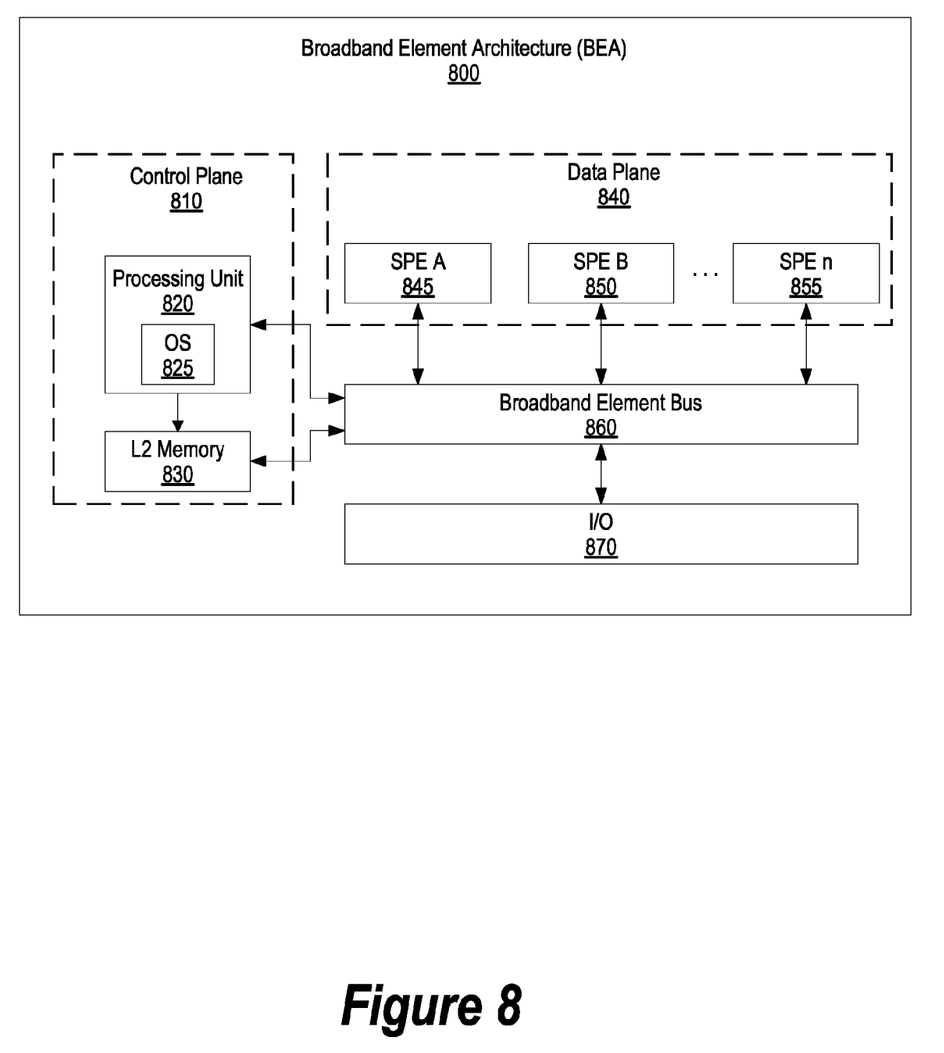
FIG. 8 is a diagram showing a broadband element architecture which includes a plurality of heterogeneous processors that implements the invention described herein.

FIG. 8 is a diagram showing a broadband element architecture which includes a plurality of heterogeneous processors capable of implementing the invention described herein. The heterogeneous processors share a common memory and a common bus. Broadband element architecture (BEA) 800 sends and receives information to/from external devices through input output 870, and distributes the information to control plane 810 and data plane 840 using processor element bus 860. Control plane 810 manages BEA 800 and distributes work to data plane 840.

Control plane 810 includes processing unit 820, which runs operating system (OS) 825. For example, processing unit 820 may be a Power PC core that is embedded in BEA 800 and OS 825 may be a Linux operating system. Processing unit 820 manages a common memory map table for BEA 800.

The memory map table corresponds to memory locations included in BEA 800, such as L2 memory 830 as well as non-private memory included in data plane 840.

Data plane 840 includes Synergistic processing element's (SPE) 845, 850, and 855. Each SPE is used to process data information and each SPE may have different instruction sets. For example, BEA 800 may be used in a wireless communications system and each SPE may be responsible for separate processing tasks, such as modulation, chip rate processing, encoding, and network interfacing. In another example, each SPE may have identical instruction sets and may be used in parallel to perform operations benefiting from parallel processes. Each SPE includes a synergistic processing unit (SPU), which is a processing core, such as a digital signal processor, a microcontroller, a microprocessor, or a combination of these cores.

SPE 845, 850, and 855 are connected to processor element bus 860, which passes information between control plane 810, data plane 840, and input/output 870. Bus 860 is an on-chip coherent multi-processor bus that passes information between I/O 870, control plane 810, and data plane 840. Input/output 870 includes flexible input-output logic, which dynamically assigns interface pins to input output controllers based upon peripheral devices that are connected to BEA 800.

Figure 9:
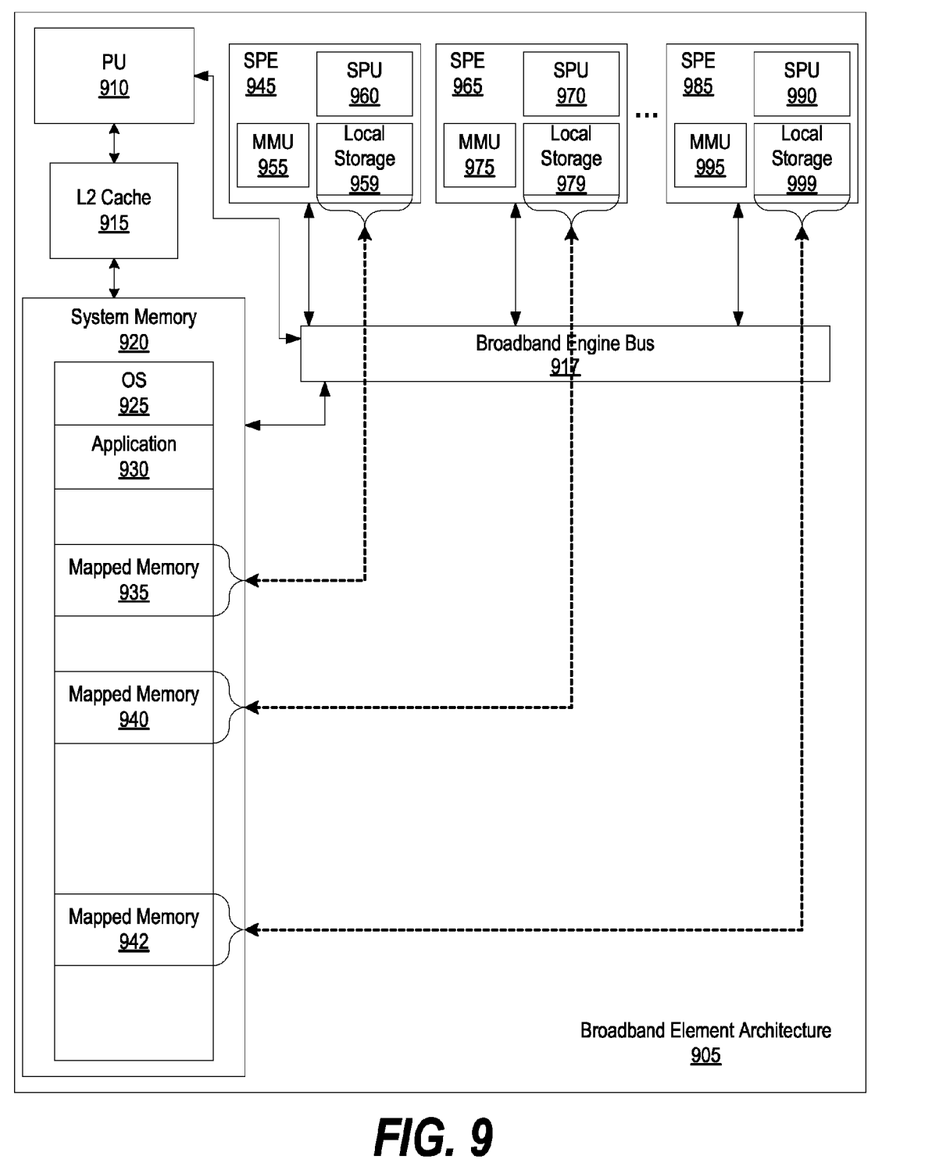
FIG. 9 is a block diagram illustrating a processing element having a main processor and a plurality of secondary processors sharing a system memory.

FIG. 9 is a block diagram illustrating a processing element having a main processor and a plurality of secondary processors sharing a system memory. Broadband Element Architecture (BEA) 905 includes processing unit (PU) 910, which, in one embodiment, acts as the main processor and runs the operating system. Processing unit 910 may be, for example, a Power PC core executing a Linux operating system. BEA 905 also includes a plurality of synergistic processing elements (SPEs) such as SPEs 945 through 985. Each SPE includes a synergistic processing unit (SPU) that act as secondary processing units to PU 910, a memory storage unit, and local storage. For example, SPE 945 includes SPU 960, MMU 955, and local storage 959; SPE 965 includes SPU 970, MMU 975, and local storage 979; and SPE 985 includes SPU 990, MMU 995, and local storage 999.

In one embodiment, the SPEs process data under the control of PU 910. The SPEs may be, for example, digital signal processing cores, microprocessor cores, micro controller cores, etc., or a combination of the above cores. In one embodiment, each one of the local stores is a storage area associated with a particular SPU. Each SPU can configure its local store as a private storage area, a shared storage area, or an SPU's local store may be partly private and partly shared.

For example, if an SPU requires a substantial amount of local memory, the SPU may allocate 100% of its local store to private memory accessible only by that SPU. If, on the other hand, an SPU requires a minimal amount of local memory, the SPU may allocate 10% of its local store to private memory and the remaining 90% to shared memory. The shared memory is accessible by PU 910 and by the other SPEs. An SPU may reserve part of its local store in order for the SPU to have fast, guaranteed access to some memory when performing tasks that require such fast access. The SPU may also reserve some of its local store as private when processing sensitive data, as is the case, for example, when the SPU is performing encryption/decryption.

The MMUs are responsible for transferring data between an SPU's local store and the system memory. In one embodiment, an MMU includes a direct memory access (DMA) controller configured to perform this function.

Each SPE may be set up to perform a different task, and accordingly, in one embodiment, each SPE may be accessed using different instruction sets. If BEA 905 is being used in a wireless communications system, for example, each SPE may be responsible for separate processing tasks, such as modulation, chip rate processing, encoding, network interfacing, etc. In another embodiment, each SPE may have identical instruction sets and may be used in parallel to perform operations benefiting from parallel processes.

The shared portion of the SPEs' local stores may be accessed by PU 910 as well as by the other SPEs by mapping each shared region to system memory 920. In one embodiment, PU 910 manages the memory map for the common system memory 920. The memory map table may include PU 910's L2 Cache 915, system memory 920, as well as the SPEs' shared local stores.

A portion of system memory 920 as shown is occupied by the operating system (OS 925). System Memory 925 also contains data 940, which represents data to be processed by SPU 910 as well as by the SPEs. In one embodiment, a process executing on the PU receives a request for a task involving the processing of large data. The PU first determines an optimum method for performing the task as well as an optimum placement of the data in common system memory 920. The PU may then initiate a transfer of the data to be processed from disk 935 to system memory 920.

In one embodiment, the PU arranges the data in system memory 925 in data blocks the size of the registers of the SPEs. In one embodiment, the SPEs may have 128 registers, each register being 128 bits long.

The PU then searches for available SPEs and assigns blocks of data to any available SPEs for processing of the data. The SPEs can access the common system memory (through a DMA command, for example) transfer the data to the SPEs' local store, and perform the assigned operations. After processing the data, the SPEs may transfer the data (using DMA again, for example) back to common system memory 920. This procedure may be repeated as SPEs become available until all the data blocks have been processed.

Figure 10:
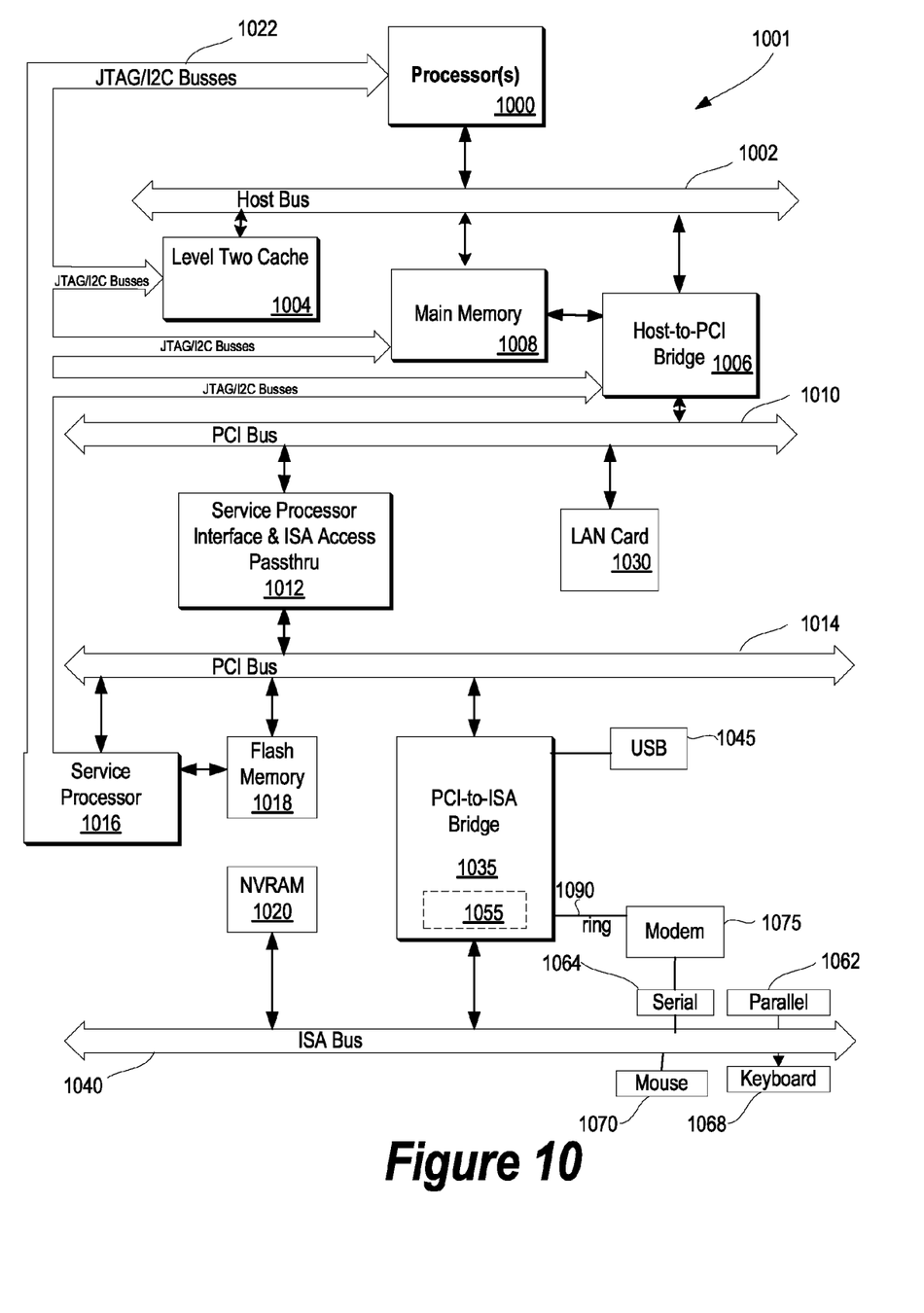
FIG. 10 is a block diagram of a computing device that implements the present invention.

FIG. 10 illustrates information handling system 1001, which is a simplified example of a computer system capable of performing the computing operations described herein. Computer system 1001 includes processor 1000, which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 10105 is connected to serial port 1064 and PCI-to-ISA Bridge 1035.

While FIG. 10 shows one information handling system that employs processor(s) 1000, the information handling system may take many forms. For example, information handling system 1001 may take the form of a desktop, server, portable, laptop, notebook, or other form factor computer or data processing system. Information handling system 1001 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer operable storage medium, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
building a test case to test a first congruence class from a plurality of congruence classes that partitions a cache, the first congruence class corresponding to a congruence class identifier first value;
executing the test case by a processor, which results in testing the first congruence class;
after the executing, changing, by the processor, the congruence class identifier to a second value; and
re-executing, by the processor, the test case using the congruence class identifier second value, which results in testing a second congruence class from the plurality of congruence classes, wherein the second congruence class is different than the first congruence class.

2. The method of claim 1 wherein the first congruence class spans each of a plurality of congruence pages included in the cache.

3. The method of claim 2 wherein data corresponding to the first congruence class is duplicated for the second congruence class in order for the test case to produce the same result when testing the first congruence class and the second congruence class.

4. The method of claim 1 wherein, during the building of the test case, the method further comprises:
pseudo-randomly identifying an unused sector from a plurality of sectors that are included in the first congruence class;
building an instruction to access the identified unused sector; and
including the built instruction into the test case.

5. The method of claim 4 further comprising:
wherein the test case includes one or more instructions that access each of the plurality of sectors included in the first congruence class; and
wherein the re-execution of the test case using the congruence class identifier second value results in the one or more instructions accessing each of a plurality of sectors located in the second congruence class.

6. The method of claim 1 wherein the method uses a binary address that includes the congruence class identifier, a cache line byte offset, and a way tag, wherein the cache line byte offset identifies a byte within a cache line and the way tag identifies a congruence page from a plurality of congruence pages.

7. The method of claim 1 wherein a device performs the building of the test case, and wherein the testing is performed on the same device.

8. An information handling system comprising:
one or more processors;
a memory accessible by one or more of the processors;
one or more nonvolatile storage devices accessible by the processors; and
a set of instructions stored in the memory, wherein one or more of the processors executes the set of instructions in order to perform actions of:
building a test case to test a first congruence class from a plurality of congruence classes that partitions a cache, the first congruence class corresponding to a congruence class identifier first value;
executing the test case, which results in testing the first congruence class;
after the executing, changing the congruence class identifier to a second value; and
re-executing the test case using the congruence class identifier second value, which results in testing a second congruence class from the plurality of congruence classes, wherein the second congruence class is different than the first congruence class.

9. The information handling system of claim 8 wherein the first congruence class spans each of a plurality of congruence pages included in the cache.

10. The information handling system of claim 9 wherein data corresponding to the first congruence class is duplicated for the second congruence class in order for the test case to produce the same result when testing the first congruence class and the second congruence class.

11. The information handling system of claim 8 wherein, during the building of the test case, the information handling system further comprising an additional set of instructions in order to perform actions of:
pseudo-randomly identifying an unused sector from a plurality of sectors that are included in the first congruence class;
building an instruction to access the identified unused sector; and
including the built instruction into the test case.

12. The information handling system of claim 11 further comprising an additional set of instructions in order to perform actions of:
wherein the test case includes one or more instructions that access each of the plurality of sectors included in the first congruence class; and
wherein the re-execution of the test case using the congruence class identifier second value results in the one or more instructions accessing each of a plurality of sectors located in the second congruence class.

13. The information handling system of claim 8 wherein the set of instructions use a binary address that includes the congruence class identifier, a cache line byte offset, and a way tag, wherein the cache line byte offset identifies a byte within a cache line and the way tag identifies a congruence page from a plurality of congruence pages.

14. The information handling system of claim 8 wherein a device performs the building of the test case, and wherein the testing is performed on the same device.

15. A computer program product stored on a non-transitory computer operable storage medium containing instructions for execution by a computer, which, when executed by the computer, cause the computer to implement a method of processing test cases, the method comprising:
- building a test case to test a first congruence class from a plurality of congruence classes that partitions a cache, the first congruence class corresponding to a congruence class identifier first value;
- executing the test case, which results in testing the first congruence class;
- after the executing, changing the congruence class identifier to a second value; and
- re-executing the test case using the congruence class identifier second value, which results in testing a second congruence class from the plurality of congruence classes, wherein the second congruence class is different than the first congruence class.

16. The computer program product of claim 15 wherein the first congruence class spans each of a plurality of congruence pages included in the cache.

17. The computer program product of claim 16 wherein data corresponding to the first congruence class is duplicated for the second congruence class in order for the test case to produce the same result when testing the first congruence class and the second congruence class.

18. The computer program product of claim 15 wherein, during the building of the test case, the method further comprises:
- pseudo-randomly identifying an unused sector from a plurality of sectors that are included in the first congruence class;
- building an instruction to access the identified unused sector; and
- including the built instruction into the test case.

19. The computer program product of claim 18 wherein the method further comprises:
- wherein the test case includes one or more instructions that access each of the plurality of sectors included in the first congruence class; and
- wherein the re-execution of the test case using the congruence class identifier second value results in the one or more instructions accessing each of a plurality of sectors located in the second congruence class.

20. The computer program product of claim 15 wherein the method uses a binary address that includes the congruence class identifier, a cache line byte offset, and a way tag, wherein the cache line byte offset identifies a byte within a cache line and the way tag identifies a congruence page from a plurality of congruence pages.

* * * * *